(12) United States Patent
Downey

(10) Patent No.: US 6,754,988 B1
(45) Date of Patent: Jun. 29, 2004

(54) INSECT CONTAINMENT TRAP HAVING DISPOSABLE CAPTURE VESSEL AND JOINING MECHANISM

(76) Inventor: Joel F. Downey, 650 North- 600 West, Kokomo, IN (US) 46901

( * ) Notice: Subject to any disclaimer, the term of this patent is extended or adjusted under 35 U.S.C. 154(b) by 0 days.

(21) Appl. No.: 10/458,418

(22) Filed: Jun. 10, 2003

(51) Int. Cl.$^7$ ................................. A01M 1/10
(52) U.S. Cl. ........................... 43/107; 43/122
(58) Field of Search ................... 43/107, 122

(56) References Cited

U.S. PATENT DOCUMENTS

| | | | | |
|---|---|---|---|---|
| 1,005,530 A | * | 10/1911 | Fritsch | 43/107 |
| 1,783,631 A | * | 12/1930 | Sladky | 43/107 |
| 1,787,421 A | * | 12/1930 | Ruddell | 43/107 |
| 1,968,954 A | * | 8/1934 | Metzger | 43/107 |
| 1,971,367 A | * | 8/1934 | Brooke | 43/107 |
| 2,193,492 A | * | 3/1940 | Richardson | 43/107 |
| 2,715,295 A | * | 8/1955 | Brown | 43/107 |
| 2,809,465 A | * | 10/1957 | Guinotte | 43/122 |
| 4,218,842 A | * | 8/1980 | Anderson | 43/122 |
| 4,244,135 A | * | 1/1981 | Harwoods | 43/122 |
| 4,360,987 A | * | 11/1982 | Lowder | 43/122 |
| 4,476,647 A | * | 10/1984 | Hall, Jr. | 43/122 |
| 4,501,088 A | * | 2/1985 | Boisvert et al. | 43/122 |
| 4,611,425 A | * | 9/1986 | Dickerson | 43/122 |
| 4,694,604 A | * | 9/1987 | Mitchell | 43/107 |
| 4,706,410 A | * | 11/1987 | Briese | 43/107 |
| 4,873,787 A | * | 10/1989 | Schneidmiller | 43/122 |
| 5,301,456 A | * | 4/1994 | Jobin et al. | 43/113 |
| 5,309,668 A | * | 5/1994 | Barton | 43/122 |
| 5,392,558 A | * | 2/1995 | Blomquist | 43/107 |
| 5,682,706 A | * | 11/1997 | Altenburg | 43/122 |
| 5,718,078 A | * | 2/1998 | Therrien | 43/107 |
| 5,842,305 A | * | 12/1998 | Liao | 43/122 |
| 6,112,452 A | * | 9/2000 | Campbell | 43/107 |
| 6,112,454 A | * | 9/2000 | Plato et al. | 43/122 |
| 6,138,402 A | * | 10/2000 | Wotton | 43/122 |
| 6,158,165 A | * | 12/2000 | Wilson | 43/107 |
| 6,301,827 B1 | * | 10/2001 | Lankster | 43/107 |
| 6,425,202 B1 | * | 7/2002 | Lin et al. | 43/107 |
| 6,550,181 B1 | * | 4/2003 | Ray | 43/107 |
| 6,637,149 B1 | * | 10/2003 | Bauer | 43/107 |

FOREIGN PATENT DOCUMENTS

| | | | | |
|---|---|---|---|---|
| AU | 9662047 A1 | * | 2/1997 | |
| DE | 2940240 A1 | * | 5/1980 | |
| DE | 3141865 A1 | * | 5/1983 | |
| EP | 1334660 A1 | * | 8/2003 | |
| GB | 2052942 A1 | * | 2/1981 | |
| GB | 2283896 A1 | * | 5/1995 | |
| JP | 8-116853 B1 | * | 5/1996 | |
| JP | 8-322448 B1 | * | 12/1996 | |
| JP | 10-215749 B1 | * | 8/1998 | |
| JP | 2002-125564 B1 | * | 5/2002 | |
| JP | 2003-144030 B1 | * | 5/2003 | |
| JP | 2003-199470 B1 | * | 7/2003 | |
| JP | 2003-274832 B1 | * | 9/2003 | |
| WO | WO-94/12025 A1 | * | 6/1994 | 43/121 |
| WO | WO-01/64032 A1 | * | 9/2001 | |
| ZA | 9603456 A1 | * | 2/1997 | |

OTHER PUBLICATIONS

Cumberland Concepts Web Page—Dripit Product www.cumberlandconcepts.com/dripit.htm.

* cited by examiner

*Primary Examiner*—Darren W. Ark
(74) *Attorney, Agent, or Firm*—Mark A. Navarre

(57) ABSTRACT

A capture apparatus for an insect containment trap includes a disposable capture vessel (which may be a plastic milk jug), a funnel element (which may be a modified plastic beverage container), and a mechanical spring-loaded clip. The funnel element interfaces the capture vessel to the baiting device, and the clip joins the mouth of the capture vessel to the mouth of the funnel element.

8 Claims, 6 Drawing Sheets

INSECT CONTAINMENT TRAP HAVING DISPOSABLE CAPTURE VESSEL AND JOINING MECHANISM

TECHNICAL FIELD

The present invention relates to insect containment traps of the type having a disposable capture vessel that is removable from a baiting device, and more particularly to an apparatus for joining a disposable capture vessel to the baiting device.

BACKGROUND OF THE INVENTION

Traps of the containment type are commonly used to control insect pests such as gnats, mosquitoes, yellow jackets, and Japanese beetles. The traps generally include a baiting device for attracting the insects, and a capture vessel for capturing the insects attracted by the baiting device. The baiting device can be self-supporting, or installed in a bottle-type container as disclosed, for example, in the U.S. Pat. No. 4,476,647 to Hall, Jr., issued on Oct. 16, 1984. The capture vessel is designed to reliably capture a particular type of insect, and is typically disposable so that the user can remove, seal and dispose of the insect-filled capture vessel. For example, a typical capture vessel for a trap designed to attract Japanese beetles is a plastic or paper bag in the shape of an hourglass that hangs from the baiting device. Due to their disposable nature, the capture vessels are typically not very durable, and must be replaced relatively frequently. The poor durability results in significant inconvenience in removing, sealing and handling the capture vessels, and frequent replacement of the capture vessels causes significant expense. Accordingly, what is needed is a containment-type insect trap that utilizes a common, inexpensive and readily available capture apparatus that is easily and quickly attached to and detached from the baiting device.

SUMMARY OF THE INVENTION

The present invention is directed to an improved apparatus for capturing insects such as Japanese beetles attracted to a baiting device, wherein the capture apparatus includes a disposable capture vessel, a funnel element and a mechanical spring-loaded clip. The capture vessel is preferably a plastic milk jug and the funnel element is preferably a modified plastic beverage container. The funnel element interfaces the capture vessel to the baiting device, and the clip joins the mouth of the capture vessel to the mouth of the funnel element. The need for continual purchase of capture vessels is generally eliminated due to the proliferation of disposable plastic milk jugs, and the spring-loaded clip permits quick removal and replacement of the capture vessel. Preferably, the clip is also configured to hold the threaded lid of the plastic milk jug to facilitate prompt sealing of the removed capture vessel.

BRIEF DESCRIPTION OF THE DRAWINGS

The present invention will now be described, by way of example, with reference to the accompanying drawings, in which:

FIG. 3A depicts a side view, FIG. 3B depicts a top view, and FIG. 3C depicts a bottom view.

DESCRIPTION OF THE PREFERRED EMBODIMENT

Figure 1:
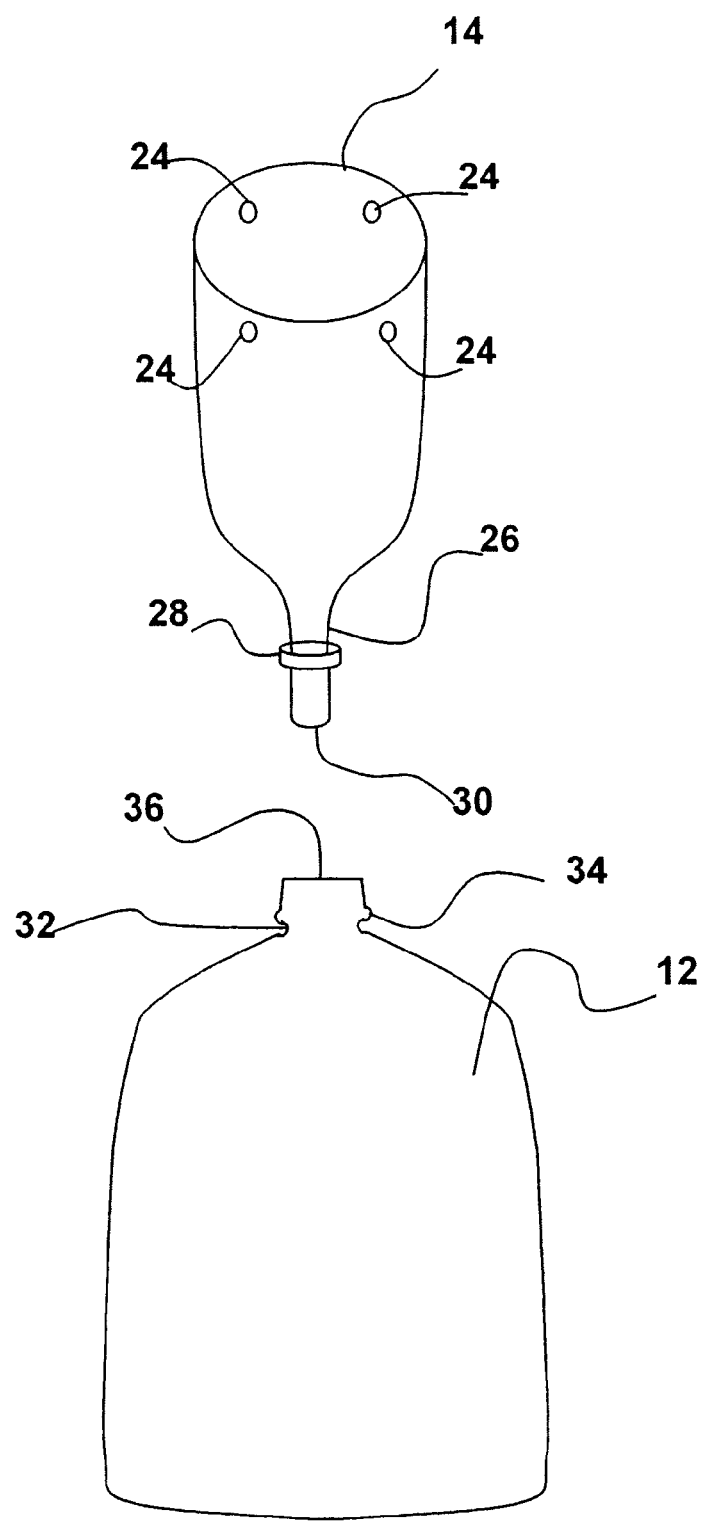
FIG. 1 is an exploded view of a funnel element and capture vessel according to this invention.
Figure 2:
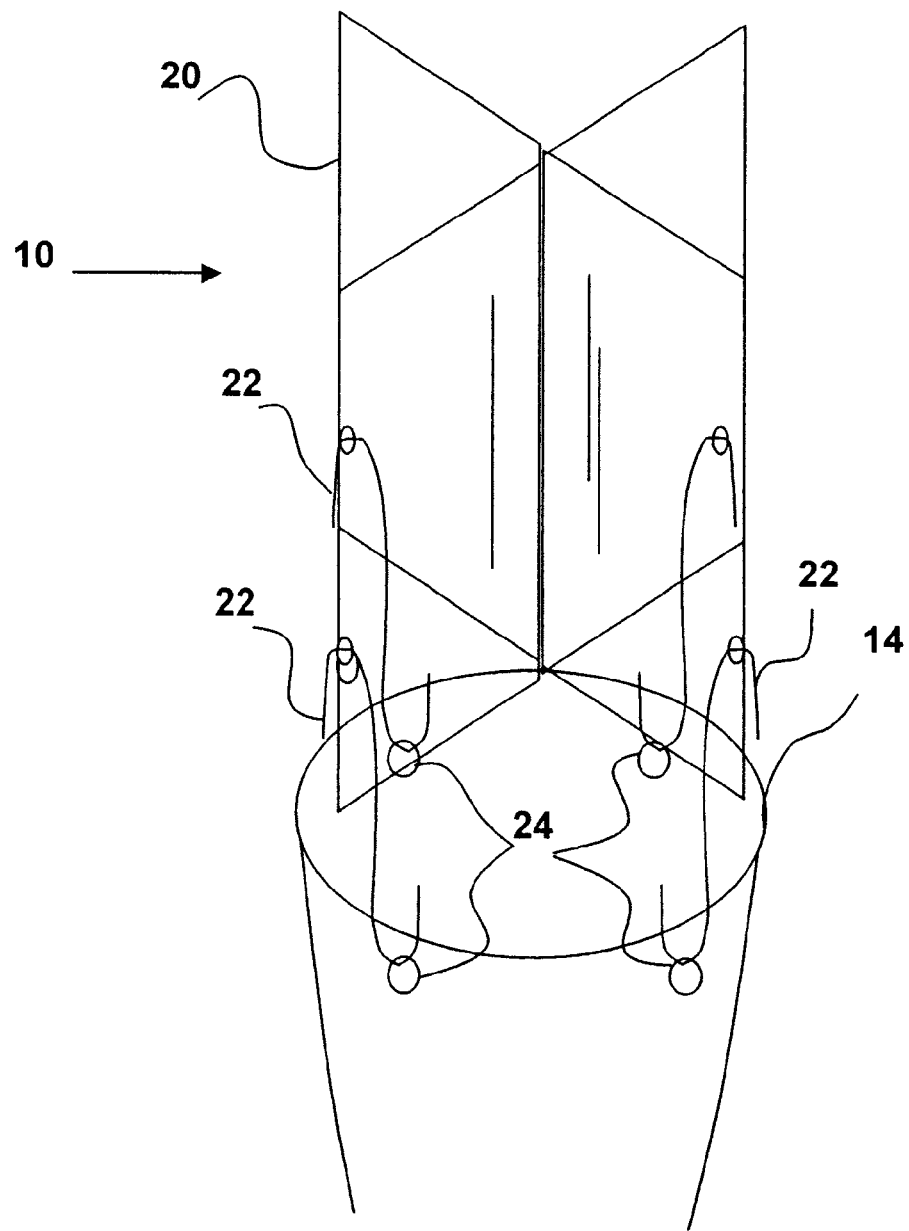
FIG. 2 illustrates an attachment of the funnel element of FIG. 1 to a conventional bait holder.
Figure 5:
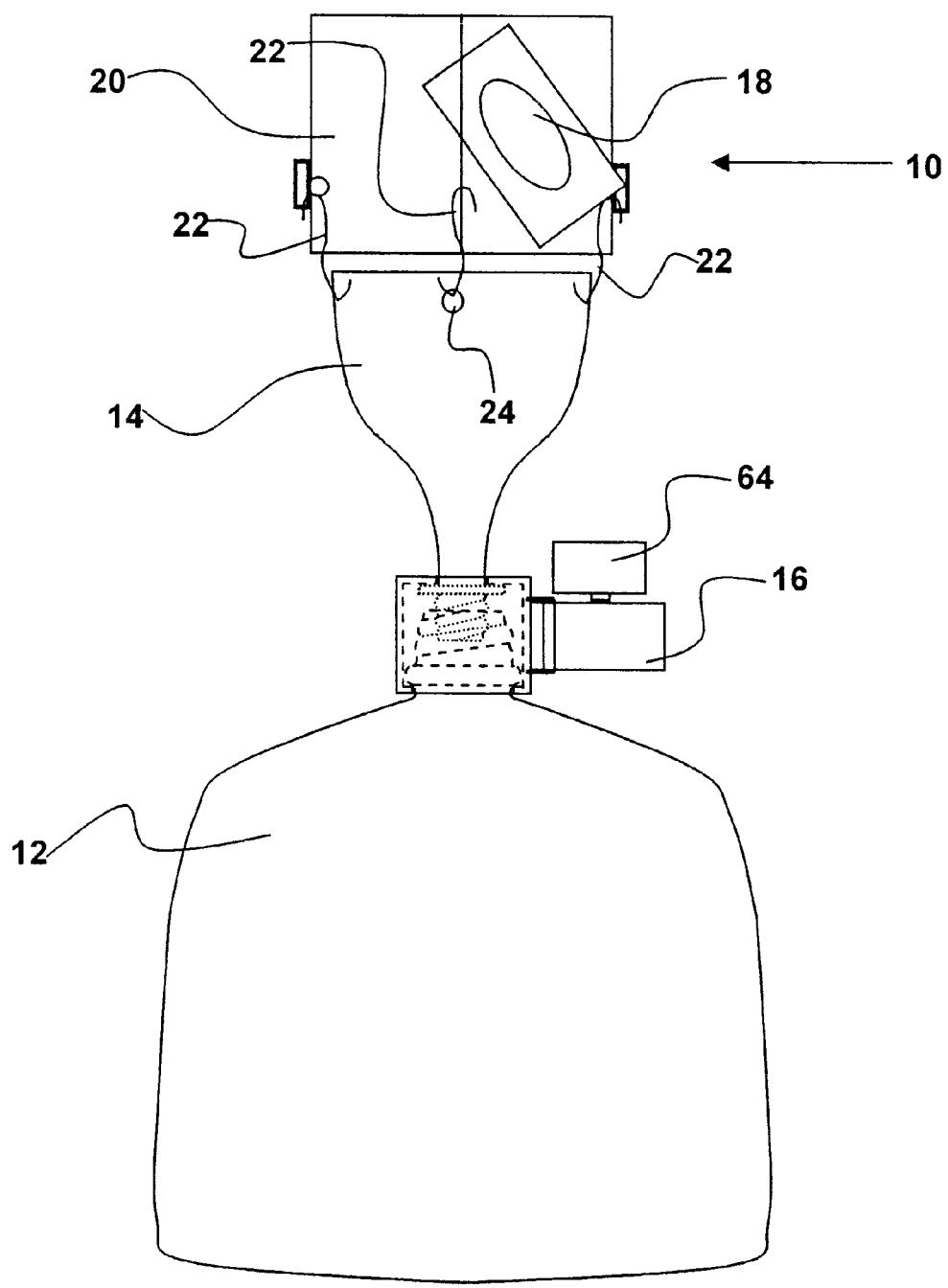
FIG. 5 depicts a fully assembled containment insect trap according to this invention.

Referring to the drawings, a containment inset trap according to this invention includes a baiting device 10, a capture vessel 12 defined by the plastic milk jug, a funnel element 14 defined by the modified plastic beverage container, and a spring-loaded clip 16. The baiting device 10 includes a bait element 18 affixed to a bait holder 20 that is adapted to be suspended from an elevated support, and the funnel element 14 is suspended from the bait holder 20 by a number of symmetrically arranged S-shaped hangars 22 as shown in FIGS. 2 and 5. The funnel element 14 is the top portion of a conventional two-liter or three-liter plastic beverage container that has been cut in two along a point roughly halfway between the top and bottom. Four symmetrically disposed holes 24 are formed in the periphery of the funnel element 14 near the cut edge for receiving the S-shaped hangars 22. A shown in FIG. 1, the un-cut end of the funnel element 14 is defined by a neck portion 26, a circular flange 28 and a mouth 30. The capture vessel 12 similarly has a neck 32, circular flange 34 and mouth 36, and the mouths 30 and 36 are sized such that the mouth 30 fits inside the mouth 36.

Figure 3A:
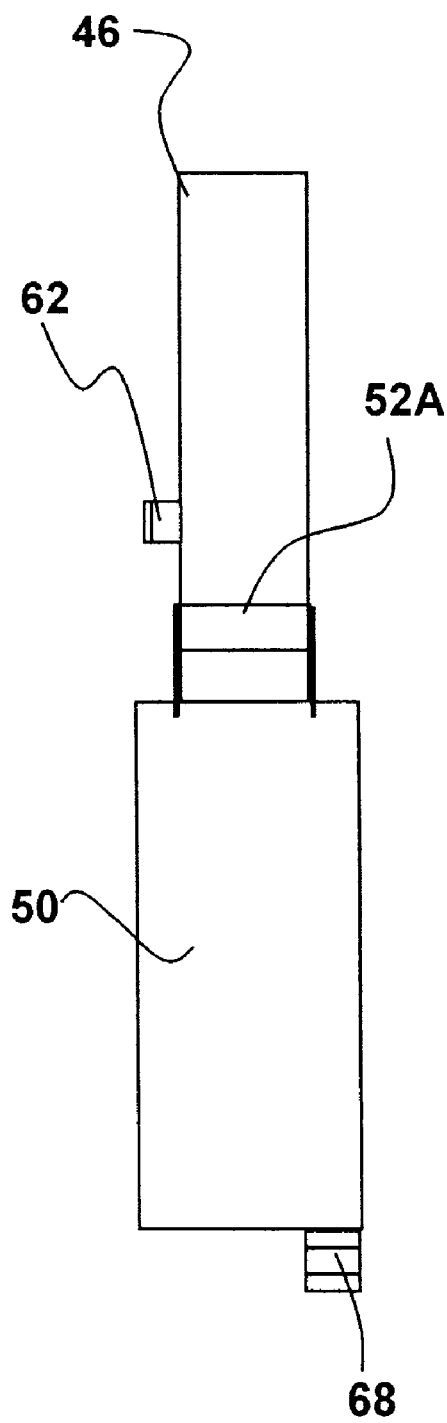
FIGS. 3A, 3B and 3C depict a mechanical spring-loaded clip according to this invention for joining the funnel element and capture vessel of FIG. 1.
Figure 3B:
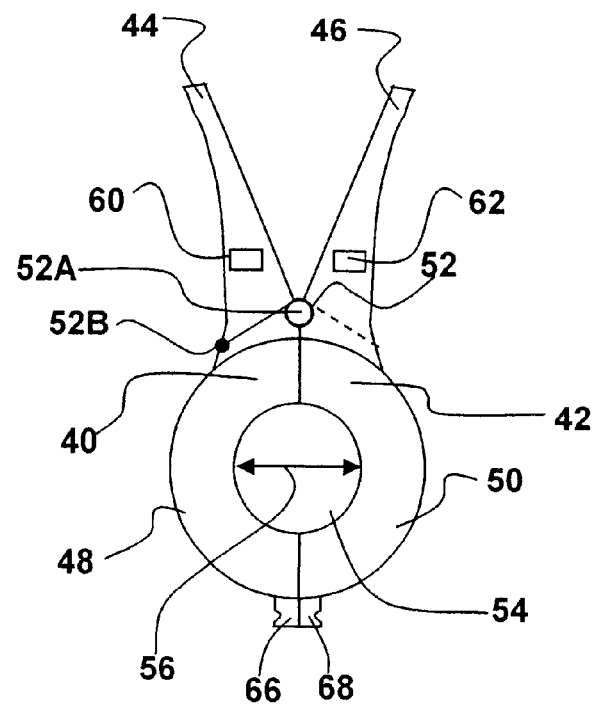
Figure 3C:
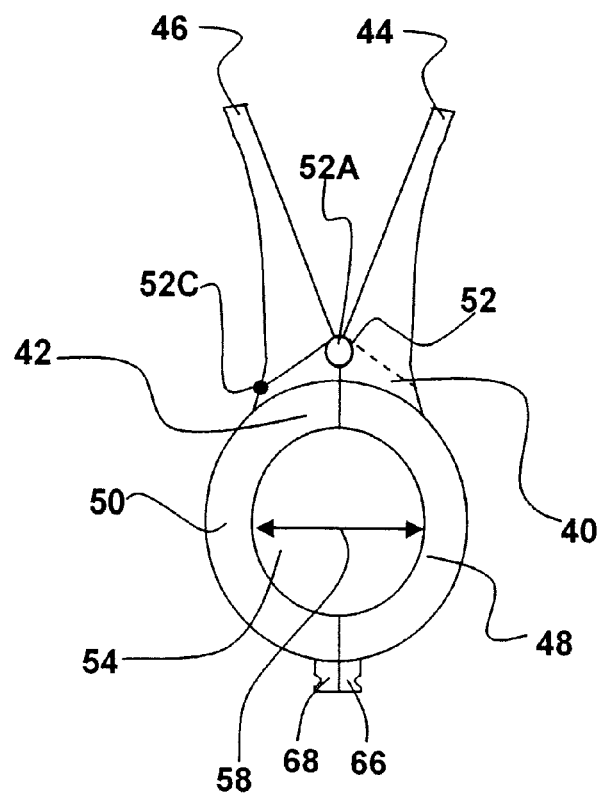
Figure 4:
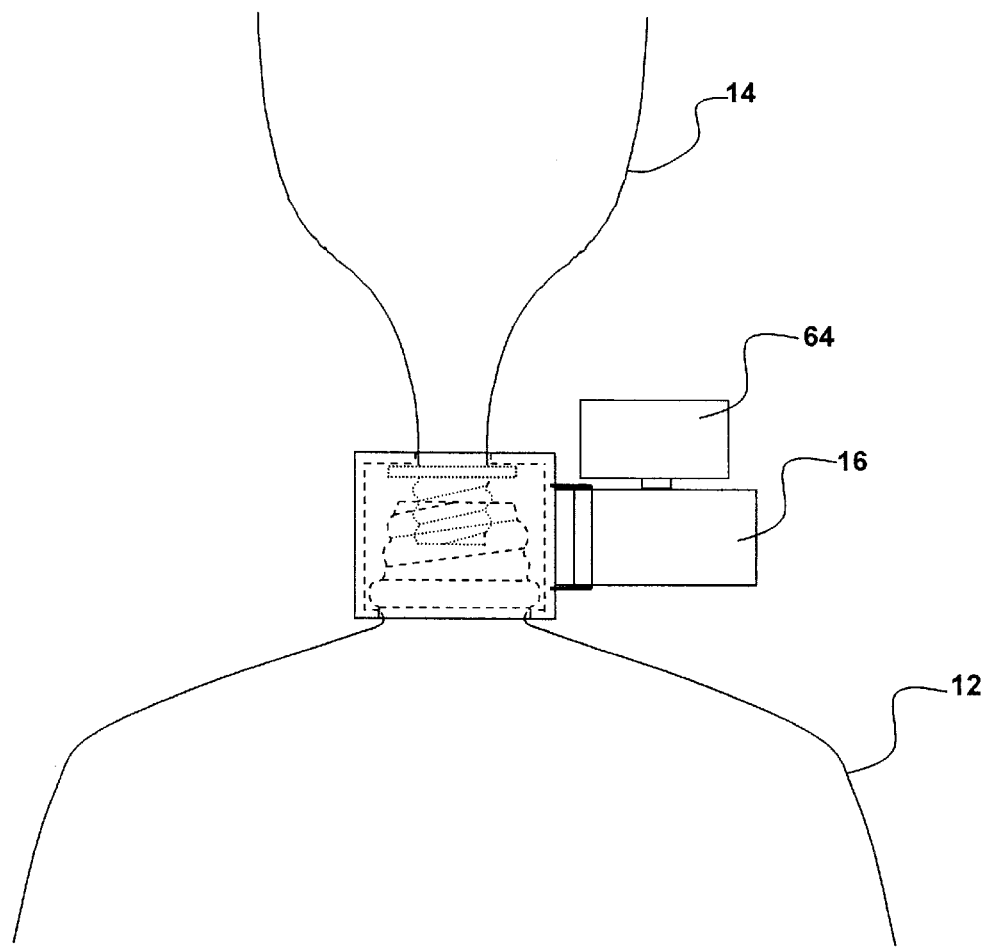
FIG. 4 depicts the clip of FIGS. 3A–3C joining the funnel element and capture vessel of FIG. 1.

As best seen in FIGS. 3A, 3B and 3C, the spring-loaded clip 16 comprises first and second mirror image half-sections 40, 42, each having a handle portion 44, 46 and a cup portion 48, 50. The half-sections 40, 42 are joined by a spring 52 that biases the half-sections 40, 42 to a closed position in which the cup portions 48, 50 abut as shown in FIGS. 3A, 3B and 3C. The spring 52 has a coil portion 52A terminating in a first tang 52B affixed to the half-section 40 and a second tang 52C affixed to the half-section 42. The handle portions 44, 46 are designed to be gripped by a user and brought together against the bias of spring 52; when this happens, the half-sections 40, 42 pivot about the coil portion 52A of spring 52 to temporarily separate the cup portions 48, 50 for changing capture vessels 12. When closed as shown in FIGS. 3A, 3B and 3C, the cup portions 48, 50 define a closed cavity 54 having first and second axially aligned apertures 56, 58. The first aperture 56, also referred to herein as the top opening, has a diameter that is larger than the outer periphery of the neck portion 26 of the funnel element 14, but smaller than the outer periphery of the flange 28. The second aperture 58, also referred to herein as the bottom opening, has a diameter that is larger than the outer periphery of the neck portion 32 of capture vessel 12, but smaller than the outer periphery of the flange 34. Thus, when the mouth 30 of the funnel element 14 is inserted into the mouth 36 of the capture vessel 12, and the clip 16 is positioned such that the flanges 28 and 34 are disposed within the cavity 54 as shown in FIGS. 4 and 5, the top opening 56 prevents the funnel element 14 from being removed from the clip 16, and the bottom opening 58 prevents the capture vessel 12 from being removed from the clip 16.

As illustrated in FIGS. 3A–3C, 4 and 5, the handle portions 44 and 46 include integral L-shaped protrusions 60 and 62 for temporarily retaining a threaded lid 64 for the capture vessel 12 when the clip 16 is in the closed position.

The protrusions 60 and 62 are thus separated by a dimension such that their lateral extremities engage the threads of the lid 64 when the clip 16 is closed. When the handle portions 44, 46 are brought together to open the clip 16, the protrusions 60 and 62 are likewise retracted, releasing the lid 64.

Optionally, the half sections 40, 42 may additionally include integral tabs 66, 68 extending from the cup portions 48, 50 that abut as shown in FIGS. 3B–3C when the clip 16 is closed. The tabs 66, 68 are preferably notched as shown so that a twist-tie or string wrapped around the tabs 66, 68 and seated in the notches may be tightened to securely hold the clip 16 in the closed position.

In summary, the present invention provides an insect containment trap featuring a disposable capture vessel that is common and readily available, an inexpensive funnel element for interfacing the capture vessel to a baiting device, and a spring-loaded clamp to conveniently and securely join the capture vessel and the funnel element. The capture vessel 12 is easily changed by simply squeezing the clip handle portions 44, 46 together to release the capture vessel 12 from the funnel element 14, removing the lid 64 from the protrusions 60, 62 and securing it to the mouth 36 of the old capture vessel 12, inserting the mouth 28 of funnel element 14 into the mouth 36 of a new capture vessel 12, placing the lid 64 of the new capture vessel 12 over the protrusions 60, 62, and releasing the clip handle portions 44, 46 with the flanges 28 and 34 disposed in the clip cavity 54. While this invention has been described in reference to the illustrated embodiment, it will be understood that various modifications may occur to those skilled in the art. For example, the funnel element may be embodied by a container other than the illustrated modified plastic beverage container, and the capture vessel may be embodied by a container other than the illustrated plastic milk jug, and so on. Accordingly, it will be understood that insect containment traps incorporating these and other modifications may fall within the scope of this invention, which is defined by the following claims.

What is claimed is:

1. An apparatus for capturing insects attracted to a baiting device, comprising:

a funnel element coupleable to said baiting device, and including a flanged neck and mouth extending away from said baiting device when coupled thereto;

a capture vessel including a flanged neck and mouth portion; and a clip mechanism coupling the flanged neck and mouth portion of the funnel element to the flanged neck and mouth portion of the capture vessel, the clip mechanism including first and second half sections that abut to define a closed cavity surrounding and mutually retaining the flanged neck and mouth portions of said funnel element and said capture vessel, and a spring producing a bias force that urges said first and second half sections into abutment.

2. The apparatus of claim 1, wherein the first and second half sections of said clip mechanism include handle portions extending separately away from said cavity such that moving said handle portions toward each other against the bias force of said spring moves said first and second half sections out of abutment to open said cavity.

3. The apparatus of claim 2, wherein said capture vessel includes a removable cylindrical lid, and said handle portions include L-shaped protrusions that extend oppositely to retain said lid by engaging an inner periphery of said lid when said half sections abut to define said closed cavity, and to release said lid when said handle portions are moved toward each other to open said cavity.

4. The apparatus of claim 1, wherein said cavity includes a first aperture dimensioned to retain the flanged neck and mouth portion of said funnel element, and a second aperture dimensioned to retain the flanged neck and mouth portion of said capture vessel.

5. The apparatus of claim 1, wherein at least part of the flanged neck and mouth portion of said funnel element are inserted into the capture vessel when said cavity surrounds and retains the flanged neck and mouth portions of said funnel element and said capture vessel.

6. The apparatus of claim 1, wherein said capture vessel is a plastic milk jug.

7. The apparatus of claim 1, wherein said funnel element is a portion of a plastic beverage container.

8. The apparatus of claim 1, wherein said first and second half sections of said clip mechanism include first and second tab elements that protrude from said first and second half sections and abut when said first and second half sections abut, whereby mutually securing said first and second tab elements maintains said first and second half sections in abutment.

* * * * *